Figure 1:
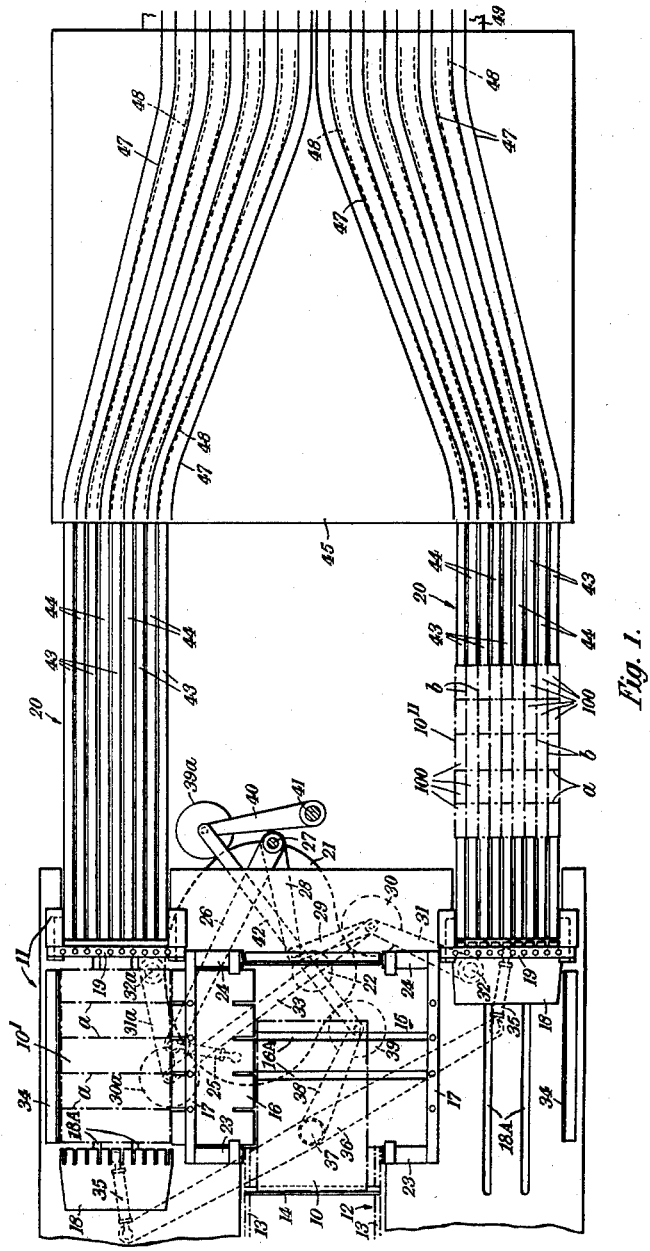

Dec. 15, 1959   K. FARRER   2,917,009
MANUFACTURE OF BISCUITS

Filed March 29, 1956   3 Sheets-Sheet 2

INVENTOR
KENNETH FARRER
By Watson, Cole, Grindle & Watson
ATTORNEYS

Dec. 15, 1959     K. FARRER     2,917,009
MANUFACTURE OF BISCUITS
Filed March 29, 1956     3 Sheets-Sheet 3
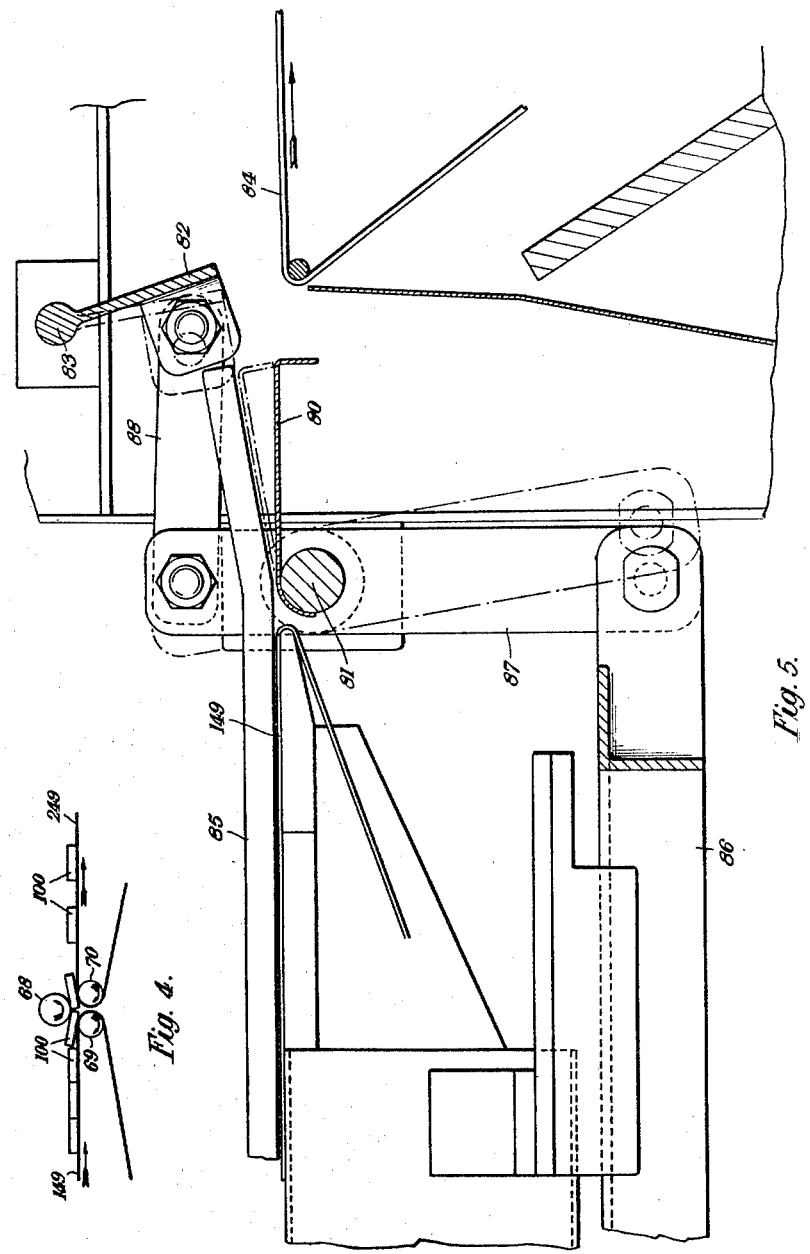
INVENTOR
KENNETH FARRER
By
Watson, Cole, Grindle & Watson
ATTORNEYS

United States Patent Office 2,917,009
Patented Dec. 15, 1959

2,917,009

MANUFACTURE OF BISCUITS

Kenneth Farrer, Peterborough, Northants, England, assignor to Baker Perkins Limited, Peterborough, Northants, England, a British company Application March 29, 1956, Serial No. 574,895

Claims priority, application Great Britain March 29, 1955

9 Claims. (Cl. 107—4)

This invention provides apparatus for cutting wafer sandwich blocks into individual sandwiches and subsequently spacing the sandwiches preparatory to their passage to an enrober in which they are coated with chocolate or the like and/or to other processing equipment for instance wrapping and packing machines.

The apparatus according to the invention comprises an input conveyor for feeding wafer sandwich blocks in succession in a single column to a cutting unit which severs the sandwich blocks transversely and longitudinally, a pair of delivery conveyors extending parallel to the input conveyor for feeding from the cutting unit laterally spaced columns of severed sandwich blocks, the cutting unit preferably comprising a reciprocating first pusher moving transversely to the input conveyor and operative to push successive incoming sandwich blocks alternately to right and left through cutting devices which sever the sandich blocks transversely, and a pair of reciprocating second pushers for pushing the severed sandwich blocks through further cutting devices, which cut the sandwich blocks longitudinally, on to the delivery conveyors, a single conveyor, extending parallel to the delivery conveyors, for receiving the sandwiches therefrom, and means for effecting lateral spacing of the sandwiches in the individual severed sandwich blocks and convergence of the two columns of laterally spaced sandwiches, during their passage to the single conveyor, so that the columns travel in closer spacing on the single conveyor.

The sandwiches, after cutting, travel forward in two feed columns, in relatively staggered groups from the cutting unit. These columns, however, are caused to converge on to a common single conveyor, the individual sandwiches in the severed sandwich blocks being at the same time laterally spaced. The common conveyor may be used to conduct the sandwiches to an enrober or to other processing equipment.

Preferably each delivery conveyor is arranged to conduct alternate lines of sandwiches in the severed sandwich blocks thereon to different levels, and a system of guides is provided for effecting lateral spacing of the sandwiches on both delivery conveyors and also convergence of the two columns of laterally spaced sandwiches as they pass to the common conveyor.

Figure 2:
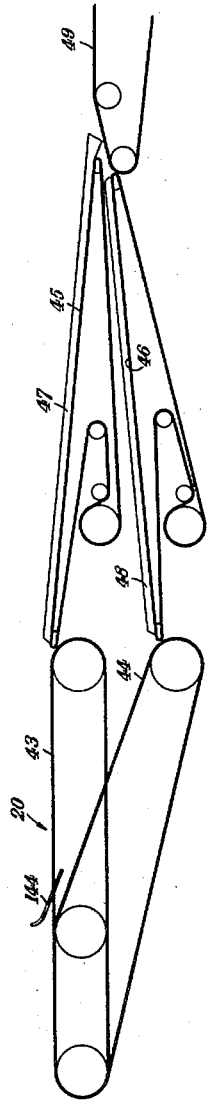
Figure 3:
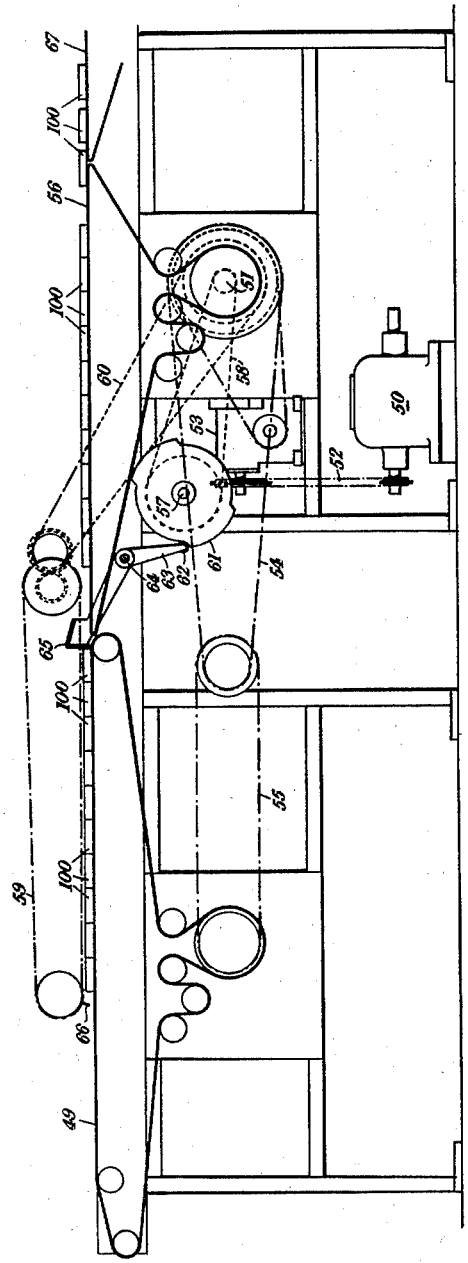

One form of apparatus according to the invention, suitable for use in equipment for making wafer sandwiches, as described in U.S. Application Serial No. 574,158, filed March 27, 1956, will now be described in detail, by way of example, with reference to the accompanying diagrammatic drawings, in which:

Fig. 1 is a plan view of the cutting unit and separator,
Fig. 2 is a side elevation of the separator,
Fig. 3 is a side elevation of one form of batcher,
Fig. 4 is a detail view of a modification, and
Fig. 5 is a side elevation on a larger scale of an alternative form of batcher.

Like reference numerals indicate like parts throughout the figures.

As indicated in Fig. 1, wafer sandwich blocks 10, which may be conveniently produced by the sandwiching machine described in U.S. Application Serial No. 574,197, filed March 27, 1956, now Patent No. 2,838,010, are fed in succession in a single column along a suitable support to a cutting unit 11 by an input conveyor 12, including a pair of chains 13 and a series of spaced flights 14 extending transversely between the chains. The cutting unit includes a dead plate 15, on to which the sandwich blocks are delivered by the conveyor 12, and a first pusher 16 which pushes alternate sandwich blocks transversely from the dead plate in opposite directions, through cutters 17 each constituted by a series of vertically extending cutter blades, wires or saws. These cut the sandwich blocks transversely as indicated by the lines $a$ in the case of the sandwich block 10'. The cutting unit also includes a pair of second pushers 18, which move the transversely cut blocks (such as 10') alternately through second cutters 19, precisely similar to the cutters 17, and on to parallel delivery conveyors 20. The ends of the pushers are slotted as shown to permit of the passage of the fingers so formed past the cutters 19. Pusher 16 is similarly slotted for coaction with cutters 17. The cutters 19 cut the sandwich blocks longitudinally, as indicated by the lines $b$ in the case of the sandwich block 10''. The pushers 16, 18 are operated by a single cam 21 mounted on a vertical cam shaft 22. The pusher 16 moves between wafer block guides 23, 24 fixed to the dead plate 15 by any conventional means, not shown, and is coupled by a link 25 to a lever 26, mounted at one end on a pivot 27 and fixed to an arm 28 coupled by a link 29 to a follower 30 cooperating with the cam 21. The follower 30 is mounted on an arm 31, pivoted at 32, and is coupled by a link 33 to a companion follower 30a, mounted on an arm 31a pivoted at 32a. The pushers 18 move between wafer block guides 34 fixed to the dead plate 15 by any conventional means, not shown, and the cutters 17 and are connected by links 35 to opposite ends of a lever 36 pivoted at 37. Fixed to the lever 36 is an arm 38, carrying a follower 39 coacting with the cam 21. A companion follower 39a, mounted on an arm 40 pivoted at 41, is coupled to the follower 39 by a link 42. Followers 30, 30a, 39, 39a are held against the face of the cam 21 by any conventional means not shown.

The levers 36 and 26 are situated below the dead plate 15 and the pushers 18 have extensions which extend downwardly through slots 18A in the dead plate and are connected to the links 35. The pusher 16 has an extension which extends downwardly through slots 16A in the dead plate and is connected to the link 25. The slots 18A and 16A not only permit of connection of the pushers 18 and 16 to their respective actuating links 35 and 25 but also serve as guides for the pushers.

The severed wafer blocks thus travel in two feed columns, in relatively staggered groups of sandwiches, from the cutting unit. The space between the constituent sandwiches 100 of the wafer blocks after cutting is only about .02" and it would be difficult to separate them laterally by wedge shaped guides. The following apparatus is therefore used for effecting lateral separation of the sandwiches and bringing the two feed columns together.

As shown most clearly in Fig. 2, each delivery conveyor 20 consists of a series of juxtaposed belts 43, 44 each supporting a single row of sandwiches, the belts 44 alternating with the belts 43. The belts 43 of each delivery conveyor carry the sandwiches supported thereby horizontally forwards and deliver them to an upper conveyor 45 extending for the full width of the machine. The belts 44 of each delivery conveyor carry the sandwiches supported thereby to a lower level, the sandwiches being constrained by deflectors 144 to follow the belts 44, and deliver them to a lower conveyor 46, also extending for the full width of the machine.

The conveyors 45, 46 carry the sandwiches, downwardly and upwardly respectively, to a common level and deliver them to a narrower common conveyor 49. Fixed sets of guides 47, 48, associated respectively with the conveyors 45, 46 not only effect lateral separation of the sandwiches on their respective conveyors but also cause the two columns of sandwiches to converge, as clearly seen in Fig. 1, so that their paths of travel on the common conveyor 49, whereon they are delivered from conveyors 45 and 46, are disposed close together.

The deflection of the sandwiches to different levels permits them to enter without difficulty the guides 47, 48 which effect lateral separation of the sandwiches and convergence of the columns.

The common conveyor 49 may deliver the sandwiches directly to a packing station but in what follows it will be assumed that the conveyor 49 conveys the sandwiches towards an enrober.

If the enrober is followed by a cooling tunnel along which the enrobed sandwiches pass in a single plane, it is only necessary to provide for closing up of the longitudinal gaps between the spaced groups of wafer sandwiches in the two columns on the conveyor 49 and then to transfer the sandwiches to a faster conveyor which separates them longitudinally before they reach the enrober.

Where, however, the enrober delivers the enrobed sandwiches on to plaques suitable for use in a circuitous cooler and the quantity of sandwiches required per plaque is not an integral number of pairs of groups, the columns of groups on the two halves of the conveyor are aligned, as explained later with reference to Fig. 5. If the plaque quantity is such an integral number, say two pairs of groups, the sandwiches are batched, before passing to the enrober, by the mechanism shown in Fig. 3. As there shown, an electric motor 50 drives a shaft 51 through a chain and sprocket drive 52 and a gear box 53 whose output shaft drives shaft 51 through a chain and sprocket drive. The shaft 51 drives the conveyor 49 through chain and sprocket drives 54, 55. It also drives a more slowly moving conveyor 56, a cam shaft 57 through a chain and sprocket drive 58 and an overhead conveyor 59 through a chain and sprocket drive 60.

The cam shaft 57 carries a cam 61, coacting with a follower 62 on a bell crank 63, pivoted at 64 and carrying a gate 65. The gate is periodically lowered to the position shown in Fig. 3, to enable it to arrest two 5-sandwich-long groups of sandwiches in each column on the conveyor 49, so bringing into alignment the groups of sandwiches in the columns and closing the sandwiches up longitudinally in both columns. The gate 65 is then lifted by the cam 61. The overhead conveyor 59 is constituted by two chains travelling at the same speed as the conveyor 49 and joined by a single pusher 66. As soon as the gate 65 has risen, the pusher 66 contacts the rear end of the batch of groups of sandwiches arrested by the gate and positively transfers it to the more slowly moving conveyor 56. As soon as the batch has passed the gate 65, the gate is lowered again. From the conveyor 56 the sandwiches pass to the wire band conveyor 67 leading to the enrober. The conveyor 67 travels faster than the conveyor 56 and so spaces the sandwiches longitudinally, as shown. The enrober, being of conventional construction, is not illustrated.

Wafer sandwiches normally have a cream filling but where, as is sometimes the case, they have a caramel filling there is a tendency for the sandwiches to adhere to their neighbours after cutting. The use of belts 43, 44 running at two levels, as shown in Fig. 2, gives a sufficiently positive lateral separation of caramel filled sandwiches, but it may be desirable in some cases to provide also for longitudinal separation as shown in Fig. 4. In this case, the conveyor 49 is replaced by two conveyors 149, 249, the conveyor 249 running faster than the conveyor 149, and a device is provided at the junction of the two conveyors for positively breaking adhesion between successive sandwiches. In the case illustrated, a driven roll 68 located above the transfer point coacts with the end rolls 69, 70 of the conveyors so as to deflect each sandwich slightly downwards between the ends of the conveyors 149 and 249 just slightly below the plane of the upper runs of the conveyors, as shown (Fig. 4), to break the joint between the sandwiches.

In this case the arresting type batcher shown in Fig. 3 could be dispensed with and a marshalling unit, similar to that described in U.S. application Serial No. 574,113, filed March 27, 1956, now Patent No. 2,884,115, used to convert the groups of sandwiches on the conveyor 249 into a continuous stream of uniformly spaced sandwiches with the two columns aligned. This formation would be suitable for an enrober with a tunnel type cooler. In the case of an enrober with a circuitous cooler, a further marshalling unit could be used for converting the uniformly spaced stream of sandwiches into batches.

Fig. 5 shows an alternative form of batcher for use in the case in which the quantity of sandwiches per plaque is not an integral number of pairs of groups, this batcher being arranged immediately following the conveyors 45 and 46 (Fig. 2). The batcher comprises a conveyor 149, receiving the sandwiches from the conveyors 45, 46 and serving to feed the two columns of sandwiches on to a dead plate 80 mounted on a rod 81. A cam (not shown) periodically actuates a link 86 and arm 87 to rock the rod 81 to lift the dead plate 80 to the position shown in chain-dotted lines, the dead plate 80 rising immediately after the last sandwich of the batch is clear of it. At the same time a stop 82 attached to a rod 83 is rocked by a link 88 into the position shown in chain dotted lines to arrest the oncoming leading sandwich of the next batch. Oncoming wafer sandwiches are arrested on the conveyor 149 by the raised dead plate, which is afterwards lowered again to permit the batch of sandwiches to be fed forward on to a faster conveyor 84, leading to the enrober and serving to space the batched sandwiches longitudinally. Side guides, one of which is shown at 85, are provided for the sandwiches.

The longitudinal space between the end of the dead plate 80 and the stop 82 compensates for the time it takes the dead plate to rise (during which time the leading sandwich will be continuing to move forward) and for slight variation in the lengths of the individual sandwiches. Thus this batcher does not need a ready made gap between the trailing sandwich of one batch and the leading sandwich of the next. The stop 82 also sereves to hold down the rear end of the trailing sandwich of the preceding batch while the front end of the leading sandwich of the next batch is raised by the dead plate 80, so ensuring that the two sandwiches cannot stick together.

The batcher shown in Fig. 5 closes up gaps between individual sandwiches and also closes up gaps between groups of sandwiches, the front ends of the leading sandwiches of each batch being in line across the conveyor 84 as they leave the batcher.

What I claim as my invention and desire to secure by Letters Patent is:

1. Apparatus for use in manufacturing wafer sandwiches comprising an input conveyor for feeding wafer sandwich blocks in succession in a single column to a cutting unit which severs the sandwich blocks transversely and longitudinally into individual sandwiches disposed in closely adjacent rows, a pair of delivery conveyors extending parallel to the input conveyor for respectively receiving alternate severed sandwich blocks from the cutting unit and feeding them in a pair of laterally spaced columns, a single conveyor, extending parallel to the delivery conveyors, means for effecting lateral spacing of the rows of sandwiches in the individual severed sandwich blocks and convergence of the two columns of laterally spaced rows of sandwiches, while advancing said columns to the single conveyor, so that the columns travel in closer spacing on said single conveyor, a gate for arresting the sandwiches in both columns on the single conveyor and thereby forming the sandwiches into batches and means for periodically removing the gate from arresting position to permit the batches of sandwiches to move forward.

2. Apparatus according to claim 1, in which an overhead conveyor is provided having a pusher for engaging each batch to move it forward on removal of the gate, and in which the overhead conveyor serves to transfer the batches from the single conveyor to a more slowly moving conveyor.

3. Apparatus according to claim 1, in which an overhead conveyor is provided having a pusher for engaging each batch to move it forward on removal of the gate, and in which the overhead conveyor serves to transfer the batches from the single conveyor to a more slowly moving conveyor, and the more slowly moving conveyor being arranged to transfer the sandwiches to a faster conveyor leading to an enrober.

4. Apparatus according to claim 1, comprising an overhead conveyor having a pusher for engaging each batch to move it forward on removal of the gate.

5. Apparatus for use in manufacturing wafer sandwiches comprising an input conveyor for feeding wafer sandwich blocks in succession in a single column to a cutting unit which severs the sandwich blocks transversely and longitudinally into individual sandwiches disposed in closely adjacent rows, a pair of delivery conveyors extending parallel to the input conveyor for respectively receiving alternate severed sandwich blocks from the cutting unit and feeding them in a pair of laterally spaced columns, each of said delivery conveyors comprising a series of upper and lower parallel belts each supporting a single row of sandwiches, alternate belts carrying the sandwiches supported thereby to a different level than that of the sandwiches supported by the other belts, a single conveyor, upper and lower wide conveyors, between the delivery conveyors and the single conveyor, for respectively receiving the sandwiches from the upper and the lower belts of each delivery conveyor and a set of guides disposed above each wide conveyor, said guides being shaped to effect both lateral spacing of the rows of sandwiches supported by said wide conveyors and inward convergence of said columns.

6. Apparatus according to claim 5, comprising a dead plate for receiving the sandwiches from the single conveyor, a faster conveyor beyond the dead plate, means for periodically lifting the dead plate, and a stop coacting with said dead plate to cause a batch of sandwiches to accumulate on the single conveyor and thereafter lowering the dead plate to allow the batch of sandwiches to travel forward onto the faster conveyor.

7. Apparatus according to claim 5 comprising a faster conveyor for receiving the sandwiches from the single conveyor and a device at the junction of the two conveyors for breaking adhesion between successive sandwiches.

8. Apparatus according to claim 7, wherein the breaking device is a driven roll disposed above the transfer point and acting to deflect each sandwich slightly downwards.

9. Apparatus for use in manufacturing wafer sandwiches comprising an input conveyor for feeding wafer sandwich blocks in succession in a single column to a cutting unit which severs the sandwich blocks transversely and longitudinally into individual sandwiches disposed in closely adjacent rows, a pair of delivery conveyors extending parallel to the input conveyor for respectively receiving alternate severed sandwich blocks from the cutting unit and feeding them in a pair of laterally spaced columns, said cutting unit comprising a reciprocating first pusher moving transversely to the input conveyor and operative to push incoming sandwich blocks alternately to left and right through cutting devices which sever the sandwich blocks transversely, a pair of reciprocating second pushers for pushing the transversely cut sandwich blocks on to the delivery conveyors through further cutting devices which cut the sandwich blocks longitudinally, a cam mounted on a vertical shaft, a first horizontal lever mounted on a central pivot and arranged to receive rocking movement from the cam, means coupling the ends of said lever to the second pushers, a second horizontal lever mounted on an end pivot and arranged to receive rocking movement from the cam, and means coupling said second lever to the first pusher, a single conveyor extending parallel to the delivery conveyors and means for effecting lateral spacing of the rows of sandwiches in the individual severed sandwich blocks and convergence of the two columns of laterally spaced rows of sandwiches, while advancing said columns to the single conveyor, so that the columns travel in closer spacing on said single conveyor.

References Cited in the file of this patent

UNITED STATES PATENTS

| | | |
|---|---|---|
| 1,626,747 | Owens | May 3, 1927 |
| 1,831,826 | Sergent | Nov. 17, 1931 |
| 2,080,113 | Cloud | May 11, 1937 |
| 2,094,718 | Pentzlin | Oct. 5, 1937 |
| 2,612,852 | Morrison | Oct. 7, 1952 |

FOREIGN PATENTS

| | | |
|---|---|---|
| 654,863 | Great Britain | July 4, 1951 |